(12) United States Patent
Tabatabai et al.

(10) Patent No.: US 7,734,997 B2
(45) Date of Patent: Jun. 8, 2010

(54) TRANSPORT HINT TABLE FOR SYNCHRONIZING DELIVERY TIME BETWEEN MULTIMEDIA CONTENT AND MULTIMEDIA CONTENT DESCRIPTIONS

(75) Inventors: Ali Tabatabai, Cupertino, CA (US); Hawley K. Rising, III, San Jose, CA (US); Mohammed Z. Visharam, Santa Clara, CA (US); Toby Walker, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 998 days.

(21) Appl. No.: 10/113,001

(22) Filed: Mar. 28, 2002

(65) Prior Publication Data

US 2002/0198905 A1 Dec. 26, 2002

Related U.S. Application Data

(60) Provisional application No. 60/294,492, filed on May 29, 2001, provisional application No. 60/294,859, filed on May 30, 2001, provisional application No. 60/295,985, filed on Jun. 4, 2001, provisional application No. 60/304,926, filed on Jul. 11, 2001.

(51) Int. Cl.
*G06F 17/00* (2006.01)
*G06F 7/00* (2006.01)

(52) U.S. Cl. .................. 715/203; 715/201; 715/202; 715/204; 707/793; 707/803

(58) Field of Classification Search ............. 715/501.1, 715/500, 201, 202, 203, 204; 707/102, 104.1, 707/793, 803
See application file for complete search history.

(56) References Cited

U.S. PATENT DOCUMENTS 5,325,449 A 6/1994 Burt et al.

(Continued)

FOREIGN PATENT DOCUMENTS

WO WO 00/28725 A2 * 5/2000

OTHER PUBLICATIONS

Martinez, José M., "Overview of the MPEG-7 Standard", ISO/IEC JTC1/SC29/W11 N3445, May/Jun. 2000, pp. 1-51, plus WayBack Machine date page.*

(Continued)

*Primary Examiner*—Robert Stevens
(74) *Attorney, Agent, or Firm*—Blakely, Sokoloff, Taylor & Zafman LLP

(57) ABSTRACT

The content description of multimedia content contains a plurality of descriptor values that pertain to specific events within the media. A Transport Hint Table (THT) provides a set of synchronization events that indicate the relation between timed events in the media and their representation in the content's description data. The THT allows for synchronized delivery of presentation of content description data with the associated events in the media. The THT provides a set of sync events based on the existence of "time" related events obtained from the content description data, which are relevant to particular events in the media. The THT allows the transport layer encoder to use the time-related events to synchronize the scheduled delivery times of media content segments and their associated descriptions. The THT also provides information for fragmenting a description for delivery and for managing resources at the decoder.

48 Claims, 7 Drawing Sheets

U.S. PATENT DOCUMENTS

| | | | |
|---|---|---|---|
| 5,495,292 A | | 2/1996 | Zhang et al. |
| 5,579,471 A | | 11/1996 | Barber et al. |
| 6,223,183 B1 | * | 4/2001 | Smith et al. ............... 707/102 |
| 6,236,395 B1 | | 5/2001 | Sezan et al. |
| 6,278,717 B1 | * | 8/2001 | Arsenault et al. ........... 370/477 |
| 6,345,279 B1 | | 2/2002 | Li et al. |
| 6,360,234 B2 | * | 3/2002 | Jain et al. ................ 715/500.1 |
| 6,393,158 B1 | * | 5/2002 | Gould et al. ................ 382/254 |
| 6,411,724 B1 | * | 6/2002 | Vaithilingam et al. ....... 382/100 |
| 6,490,370 B1 | * | 12/2002 | Krasinski et al. ............ 382/195 |
| 6,492,998 B1 | | 12/2002 | Kim et al. |
| 6,546,135 B1 | * | 4/2003 | Lin et al. ................... 382/190 |
| 6,549,922 B1 | * | 4/2003 | Srivastava et al. ........... 707/205 |
| 6,564,263 B1 | * | 5/2003 | Bergman et al. ............ 709/231 |
| 6,567,980 B1 | * | 5/2003 | Jain et al. ..................... 725/61 |
| 6,574,279 B1 | * | 6/2003 | Vetro et al. ............ 375/240.08 |
| 6,574,417 B1 | * | 6/2003 | Lin et al. ...................... 386/70 |
| 6,593,936 B1 | * | 7/2003 | Huang et al. ................ 345/619 |
| 6,643,387 B1 | * | 11/2003 | Sethuraman et al. ........ 382/107 |
| 6,650,705 B1 | * | 11/2003 | Vetro et al. ............ 375/240.08 |
| 6,748,382 B1 | * | 6/2004 | Mohan et al. ................. 707/10 |
| 6,751,623 B1 | * | 6/2004 | Basso et al. ................. 707/101 |
| 6,847,980 B1 | | 1/2005 | Benitez et al. |
| 6,873,740 B1 | * | 3/2005 | Devillers et al. ............ 382/243 |
| 6,877,134 B1 | * | 4/2005 | Fuller et al. .............. 715/500.1 |
| 6,993,789 B1 | * | 1/2006 | Sezan et al. ................. 725/142 |
| 6,995,765 B2 | | 2/2006 | Boudier |
| 7,055,168 B1 | * | 5/2006 | Errico et al. ................... 725/46 |
| 7,143,434 B1 | | 11/2006 | Paek et al. |
| 7,185,049 B1 | * | 2/2007 | Benitez et al. .............. 709/203 |
| 7,327,790 B1 | * | 2/2008 | Bretl et al. ............. 375/240.26 |
| 7,340,458 B2 | * | 3/2008 | Vaithilingam et al. .......... 707/5 |
| 7,506,024 B2 | * | 3/2009 | Benitez et al. .............. 709/203 |
| 2001/0018693 A1 | * | 8/2001 | Jain et al. ................... 707/500 |
| 2002/0159640 A1 | * | 10/2002 | Vaithilingam et al. ....... 382/218 |
| 2003/0051252 A1 | * | 3/2003 | Miyaoku et al. ............ 725/109 |
| 2003/0061610 A1 | | 3/2003 | Errico |
| 2003/0093790 A1 | | 5/2003 | Logan et al. |
| 2003/0177503 A1 | * | 9/2003 | Sull et al. ................... 725/112 |
| 2004/0267805 A1 | * | 12/2004 | Sezan et al. ................. 707/102 |
| 2006/0064716 A1 | * | 3/2006 | Sull et al. ..................... 725/37 |
| 2006/0167876 A1 | * | 7/2006 | Benitez et al. .................. 707/7 |
| 2007/0245400 A1 | * | 10/2007 | Paek et al. ................... 725/142 |
| 2009/0157736 A1 | * | 6/2009 | Benitez et al. .............. 707/102 |

OTHER PUBLICATIONS

Hunter, Jane, "MPEG-7: Behind the Scenes", D-Lib Magazine, vol. 5 No. 9, Sep. 1999, pp. 1-12.*

Auffret, Gwendal, et al., "AudioVisual-based Hypermedia Authoring: Using Structured Representations for Efficient Access to AV Documents", HyperText '99, Darmstadt, Germany, ACM 1-58113-064-3/99/2, Mar. 1999, pp. 169-178.*

"AAF: An Indrustry-Driven Open Standard for MultiMedia Authoring", AAF Developer Overview, Apr. 11, 2000, pp. 1-17.*

"MPEG Press Release", ISO/IEC JTC 1/SC 29/WG 11 N3958, Singapore, Mar. 2001, pp. 1-3.*

Rogge, Boris, et al., "A Framework for Advanced Meta-Data Handling Based on XML", Proceedings of the ProRISC/IEEE Workshop, ISBN: 90-73461-24-3, Nov. 30-Dec. 1, 2000, pp. 471-478.*

Agnew, C. Grace, "Metadata Overview", CANARIE Workshop, Nov. 30, 1999, pp. 1-20.*

"Progress in Standardization", myTV—Deliverable #4, IST-1999-11702, Sep. 30, 2000, pp. 1-60.*

"MPEG-7 Indexing of MultiMedia Content in Broadcast Environment", CustomTV—Deliverable 2, ACTS Project AC360, Feb. 1, 1999, pp. 1-39.*

"Project Documents", CustomTV—Deliverables 1 and 2 download page, p. 1 (download from: www.irt.de/customtv/docs.html).*

"Objective, Duration and Project Partners", CustomTV Homepage, pp. 1 (download from: http://web.archive.org/web/19991012210926/http://www.irt.de/customtv/customtv.html), dated: Oct. 10, 1999 (by WayBack Machine).*

Hunter, Jane, et al., "An Overview of the MPEG-7 Description Definition Language (DDL) Proposals", Signal Processing: Image Communication, vol. 16, Issues 1-2, Sep. 2000, pp. 271-293.*

Koenen, Rob, et al., "MPEG-7: A Standardised Description of Audiovisual Content", Signal Processing: Image Communication, vol. 16, Issues 1-2, Sep. 2000, pp. 5-13.*

Rehm, Eric, "Representing Internet Media Metadata Using MPEG-7 Multimedia Description Schemes", ACM Multimedia Workshop, Marina Del Rey, CA, Nov. 2000, pp. 93-98.*

Pereira, Fernando, "MPEG-7: A Standard for Describing Audiovisual Information", IEE Colloquium on Multimedia Databases and MPEG-7 (Ref. No. 1999/056), London, UK, Jan. 1999, pp. 6/1-6/6.*

"MPEG-7 Requirements", MPEG 98; Atlantic City, NJ, Oct. 1998, Doc. ID: ISO/IEC JTC1/SC29/WG11/N2461, pp. 1-16.*

"MPEG-7 Context and Objectives", MPEG 98, Atlantic City, NJ, Oct. 1998, Doc. ID: ISO/IEC JTC1/SC29/WG11/N2460, pp. 1-11.*

"MPEG-7 Proposal Package Description (PPD)", MPEG 98, Atlantic City, NJ, Oct. 1998, Doc. ID: ISO/IEC JTC1/SC29/WG11/N2464, pp. 1-6.*

Adami, N., et al., "Multimedia Documents Description by Ordered Hierarchies: The ToCAI Description Scheme", ICME 2000, New York, NY, Jul. 30-Aug. 2, 2000, pp. 781-784.*

Adami, N., et al., "ToCAI: A Framework for Indexing and Retrieval of Multimedia Documents", Proceedings of the International Conference on Image Analysis and Processing, Venice, Italy, Sep. 27-29, 1999, pp. 1027-1032.* van Beek, Peter, et al., "Content description for Efficient Video Navigation, Browsing and Personalization", IEEE Workshop on Content-Based Access of Image and Video Libraries, Hilton Head Island, SC, © 2000, pp. 40-44.*

Pfeiffer, Silvia, et al., "TV Anytime As an Application Scenario for MPEG-7", ACM Multimedia Workshop, Marina Del Rey, CA, © 2000, pp. 89-92.*

Hu, Michael J., et al., "Multimedia Description Framework (MDF) for Content Description of Audio/video Documents", DL 99, Berkley, CA, © 1999, pp. 67-75.*

Divakaran, Ajay, et al., "Video browsing System based on Compressed Doman Feature Extraction", IEEE Transactions on Consumer Electronics, vol. 46, Issue 3, Los Angeles, CA, Jun. 13-15, 2000, pp. 637-644.*

Salambier, Philippe, et al., "Description Schemes for video Programs, Users and Devices", Signal processing: Image Communication, vol. 16 Issues 1-2, Sep. 2000, pp. 211-234.*

Hunter, Jane, et al., "The Application of Metadata Standards to Video Indexing", ECDL '98, LNCS 1513, Springer-Verlag, Berlin, Germany, © 1998, pp. 135-156.*

Nack, Frank, et al., "Everything You Wanted to Know About MPEG-7: Part 2", IEEE Multimedia, vol. 6, Issue 4, Oct.-Dec. 1999, pp. 64-73.*

Lindsay, Adam T., et al., "Representation and Linking Mechanisms for Audio in MPEG-7", Signal Processing: Image Communication, vol. 16, Issues 1-2, Sep. 2000, pp. 193-209.*

Signès, Julien, et al., "MPEG-4's Binary Format for Scene Description", Signal Processing: Image Communication, vol. 15, Issues 4-5, Jan. 2000, pp. 321-345.*

Eleftheriadis, Alexandros, "MPEG-4 Systems: Architecting Object-Based Audio-Visual Content", The Journal of VLSI Processing, vol. 27, Nos. 1-2, Feb. 2001, pp. 55-67.*

Herpel, Carsten, et al., "MPEG-4 Systems: Elementary Stream Management", Signal Processing: Image Communication, vol. 15, Issues 4-5, Jan. 2000, pp. 299-320.*

International Organisation for Standardisation, *Study of ISO/IEC 13818-1/2000/FPDAM1*, ISO/IEC JTC1/SC29/WG11N4403, Dec. 2001.

Hu, et al., "Multimedia Description Framework (MDF) for Content Description of Audio/Video Documents", School of EEE, Nanyang Technological University, 1999, pp. 67-75.

Eric Rehm, "Representing Internet Streaming Media Metadata Using MPEG-7 Multimedia Descriptions Schemes", Singingfish.com, 2000, pp. 93-98.

* cited by examiner

US 7,734,997 B2

TRANSPORT HINT TABLE FOR SYNCHRONIZING DELIVERY TIME BETWEEN MULTIMEDIA CONTENT AND MULTIMEDIA CONTENT DESCRIPTIONS

CLAIM OF PRIORITY

This application is related to, and hereby claims the benefit of, provisional application No. 60/294,492 filed May 29, 2001, provisional application No. 60/294,859, filed on May 30, 2001, provisional application No. 60/295,985, filed on Jun. 4, 2001 and provisional application No. 60/304,926 filed Jul. 11, 2001, which are hereby incorporated by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Copyright © 2002, Sony Electronics, Inc., All Rights Reserved.

FIELD OF THE INVENTION

The present invention relates generally to delivery of multimedia content and multimedia content descriptions, and more particularly to the synchronized delivery of multimedia content and content descriptions.

BACKGROUND OF THE INVENTION

Digital multimedia information is becoming widely distributed though broadcast transmission, such as digital television signals, and interactive transmission, such as the Internet. The information may be in still images, audio feeds, or video data streams. However, the availability of such a large volume of information has led to difficulties in identifying content that is of particular interest to a user. Various organizations have attempted to deal with the problem by providing a description of the information that can be used to search, filter and/or browse to locate the particular content. The Moving Picture Experts Group (MPEG) has promulgated a Multimedia Content Description Interface standard, commonly referred to as MPEG-7 to standardize the content descriptions for multimedia information. In contrast to preceding MPEG standards such as MPEG-1 and MPEG-2, which define coded representations of audio-visual content, an MPEG-7 content description describes the structure and semantics of the content and not the content itself.

Using a movie as an example, a corresponding MPEG-7 content description would contain "descriptors" (D), which are components that describe the features of the movie, such as scenes, titles for scenes, shots within scenes, time, color, shape, motion, and audio information for the shots. The content description would also contain one or more "description schemes" (DS), which are components that describe relationships among two or more descriptors and/or description schemes, such as a shot description scheme that relates together the features of a shot. A description scheme can also describe the relationship among other description schemes, and between description schemes and descriptors, such as a scene description scheme that relates the different shots in a scene, and relates the title feature of the scene to the shots.

MPEG-7 uses a Data Definition Language (DDL) that specifies the language for defining the standard set of description tools (DS, D) and for defining new description tools and provides a core set of descriptors and description schemes. The DDL definitions for a set of descriptors and description schemes are organized into "schemas" for different classes of content. The DDL definition for each descriptor in a schema specifies the syntax and semantics of the corresponding feature. The DDL definition for each description scheme in a schema specifies the structure and semantics of the relationships among its children components, the descriptors and description schemes. The DDL may be used to modify and extend the existing description schemes and create new description schemes and descriptors.

The MPEG-7 DDL is based on XML (extensible markup language) and the XML Schema standards. The descriptors, description schemes, semantics, syntax, and structures are represented with XML elements and XML attributes. Some of the XML elements and attributes may be optional.

The MPEG-7 content description for a particular piece of content is defined as an instance of an MPEG-7 schema; that is, it contains data that adheres to the syntax and semantics defined in the schema. The content description is encoded in an "instance document" that references the appropriate schema. The instance document contains a set of "descriptor values" for the required elements and attributes defined in the schema, and for any necessary optional elements and/or attributes. For example, some of the descriptor values for a particular movie might specify that the movie has three scenes, with scene one having six shots, scene two having five shots, and scene three having ten shots. The instance document may be encoded in a textual format using XML, or in a binary format, such as the binary format specified for MPEG-7 data, known as "BiM," or a mixture of the two formats.

The instance document is transmitted through a communication channel, such as a computer network, to another system that uses the content description data contained in the instance document to search, filter and/or browse the corresponding content data stream. Typically, the instance document is compressed for faster transmission. An encoder component may both encode and compress the instance document or the functions may be performed by different components. Furthermore, the instance document may be generated by one system and subsequently transmitted by a different system. A corresponding decoder component at the receiving system uses the referenced schema to decode the instance document. The schema may be transmitted to the decoder separately from the instance document, as part of the same transmission, or obtained by the receiving system from another source. Alternatively, certain schemas may be incorporated into the decoder.

The content description may be transmitted prior to, or subsequent to, the content that it describes or may be transmitted along with the content. For example, MPEG-2 provides mechanisms for the inclusion of a content metadata stream with the content video stream. An MPEG-7 content description may be transmitted in this additional data stream. However, some standards may not allow for such an additional stream, and no current standards allow for the synchronization of the descriptive data with its associated content. That is, with current standards, the content descriptions descriptor values and the multimedia content they describe (e.g., scene, shot, frame) are not synchronized for delivery and presentation. For example, the current MPEG-7 standard lacks the necessary tools to map the timed transport of MPEG-7 data onto arbitrary delivery layers such as MPEG-2 and MPEG-4, to achieve synchronization with the multimedia content.

SUMMARY OF THE INVENTION

The content description of multimedia content contains a plurality of descriptor and description scheme values that pertain to specific events within the media. A transport hint table provides a set of synchronization events that indicate the relation between timed events in the media and their representation in the content's description data. The transport hint table is created from the events in the content description relevant to specific events in the media. The Transport Hint table allows for synchronized delivery or presentation of content description data with the associated events in the media. Furthermore the invention provides methods for transmission of the transport hint table over various delivery schemes. The Transport Hint table provides information for fragmenting a description for delivery and for managing resources at the decoder.

Other features of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

Figure 1:
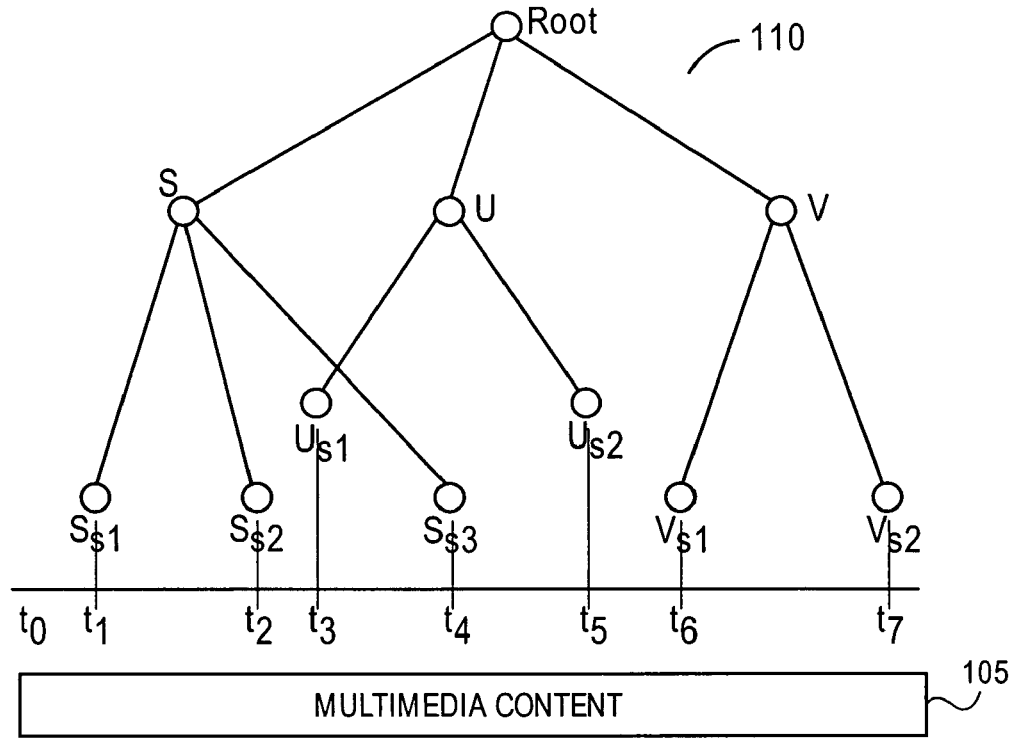
FIG. 1 illustrates a graphical representation of an MPEG-7 description and a transport hint table (THT) generated from the description data.

Embodiments of the present invention provide methods and apparatuses for creating and providing a transport hint table (THT) for multimedia content descriptions. The THT provides "hints" about the existence of time-related events in the content, obtained from the relevant MPEG-7 XML tags contained in the MPEG-7 content description of the multimedia content. The THT allows the transport layer encoder to use the time-related events called sync events to synchronize the scheduled delivery times of media content segments and their associated descriptions.

In the following detailed description, explanation and reference are directed to the creation and use of a THT for an MPEG-7 Content Description. Alternative embodiments of the present invention can have applications to other forms of content descriptions. Additionally, other specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Typical MPEG-7 content descriptions are graphically represented as "tree" diagrams wherein the nodes represent content descriptors and descriptor schemes. The descriptors and descriptor schemes are defined by XML tags. Base-level nodes provide low-level descriptors (e.g., color, etc.) or references to media elements. The low-level descriptors are combined to form progressively higher-level description schemes ascending the tree diagram. For example, for video data, the higher-level nodes describe the event, in general (e.g., movie title), while lower-level nodes describe particular scenes, shots, and frames.

The THT contains a number of sync events; a sync event may occur at any time. Each sync event may have a number of elements. For example, in one embodiment a sync event may include reference information, temporal information, and definition information. The reference information identifies the node, or group of nodes, that describes the event in the content description. In one possible embodiment, the reference is a path expression in the XML path language (XPath). An XPath expression consists of a set of steps that specifies the traversal of a path in the tree structure of an XML document starting from a node called the context node, which is often the root node of an XML document. Each step in an XPath expression is relative to a set of context nodes specified by the previous step. The location indicates temporal location in the media, which are the start time and end time of the sync event. Finally, the definition information provides an optional description (e.g., textual description) of the sync event. The THT may include other elements to provide more, or different levels of, details of the MPEG-7 content description.

In one embodiment, the THT is created by parsing the content description of the multimedia content. For example, the MPEG-7 XML tags (e.g., "MediaTime", "MediaLocator", "TemporalSegmentLocator", "ImageLocator", etc.) contained within the description are used to generate a list of sync events. For one embodiment, each sync event has an associated reference, location, and definition. The reference indicates the path, within the content description, to the particular event. The location provides information about the temporal location in the media, which is the start time and duration of the sync event. The definition describes the event, e.g., a textual description of the multimedia content. The THT information may be used to provide synchronization between delivery of segments of multimedia content and their associated descriptions. That is, in one embodiment the description may be made available at the same time as the content (e.g., scene, shot, frame) it describes. The THT may alternatively be used by the decoder for resource management purpose or for resynchronization by the user to access selected content, or by the encoder to determine the access units (AU's) of the content description for transmission based on the sync events.

FIG. 1 illustrates the graphical representation of an MPEG-7 Content Description and a THT generated from the content data. FIG. 1 shows multimedia content 105, for example, a portion of a football game that may be described using the MPEG-7 standard. Tree diagram 110 is a graphical representation of the MPEG-7 content description of multimedia content 105. The root node of tree diagram 110 may describe the entire event, in this case a touchdown sequence of a football game. Intermediate nodes, S, U, and V, may describe the passing, defense, and actual scoring, respectively, while lower level nodes may provide more detail for particular shots. For example nodes $U_{S1}$ and $U_{S2}$ may describe the blocking and running, respectively, involved in the defensive action to which node U pertains.

In accordance with one embodiment, THT 125 is created from the MPEG-7 content description (tree diagram 110) and a number of different sync events 115 are identified from the MPEG-7 content description. The sync event in the resulting THT may be ordered according to the fields in each sync event. In one embodiment, sync events are sorted by the time of the sync event. In an alternative embodiment, sync events may be ordered by a composite key formed by a plurality of (1) the reference, (2) start time and (3) definition.

Each sync event in FIG. 1 contains a content description reference (or key) information, temporal information, and definition information. The reference defines a path, such as an XPath expression, used for traversing the tree diagram 110. For example the reference /S/$S_{S1}$ indicates a path from the root node ("/" indicates the root node), through node S to node $S_{S1}$. Typically an MPEG-7 content description tree diagram may have tens or hundreds of levels between the root node and a node of interest. The temporal information specifies the temporal location of the media that is described by the content description indicated by the reference. For example, a temporal location may be indicated by the start time and duration of the sync event. Finally, the definition information provides a textual description of the sync event.

Figure 2:
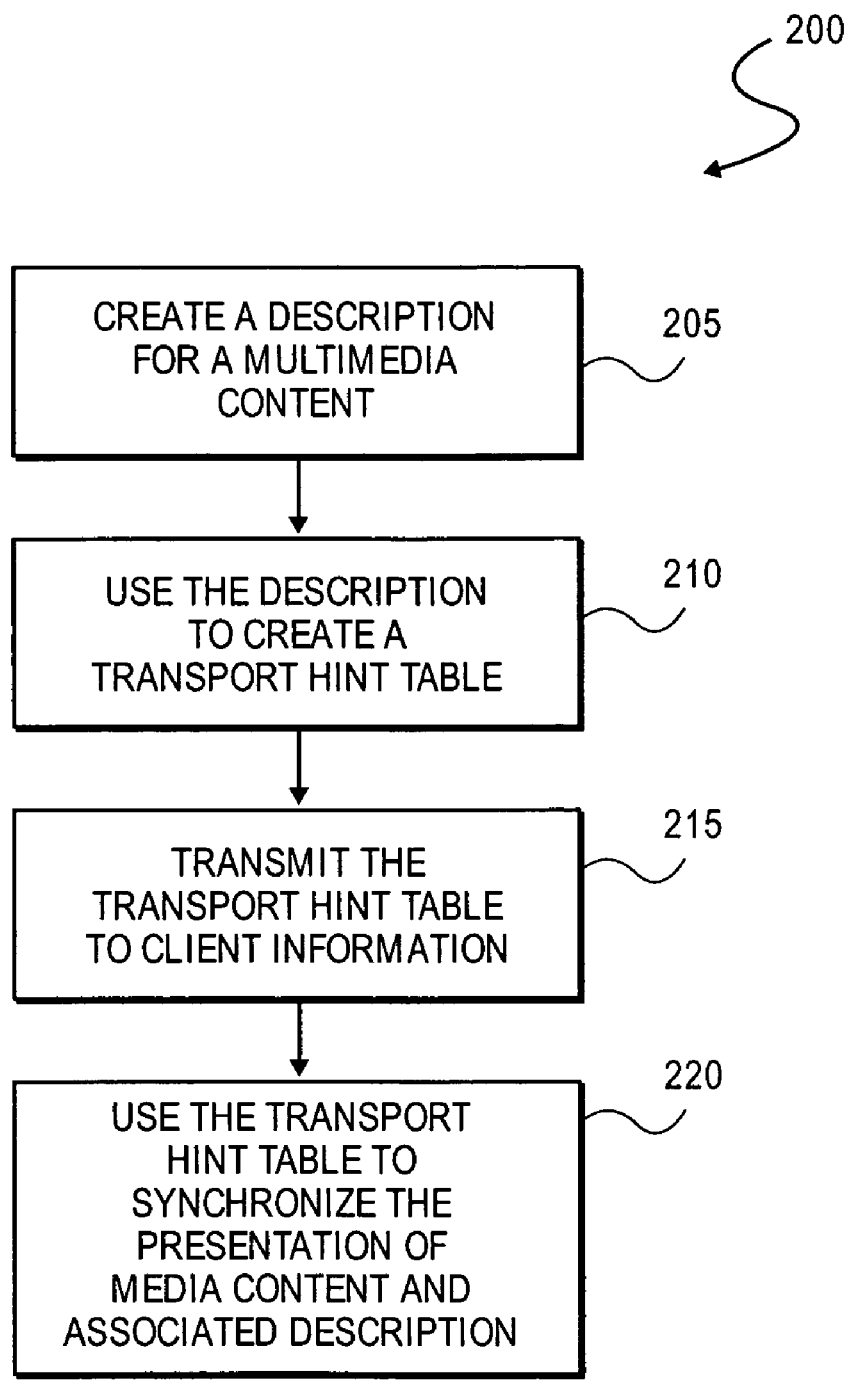
FIG. 2 is a process flow diagram.

FIG. 2 is a process flow diagram in accordance with one embodiment of the present invention. The process 200, shown in FIG. 2, begins with block (one or more blocks or processes) 205 in which a description of multimedia content (e.g., MPEG-7 Content Description) is created or available a-priori. The process of creation of the MPEG-7 is not defined in this invention but may be automatically or manually created description data using methods well known to one of skill in the art.

At block 210, the content description is used to create a THT. For one embodiment, the THT may be generated from an MPEG-7 content description using an event parser (simple API for XML (SAX) parser) programmed to generate the time related sync events based on the temporal information provided by the relevant MPEG-7 XML tags in the MPEG-7 content description (e.g., "MediaTime", "MediaLocator", "TemporalSegmentLocator", "ImageLocator", etc). Exemplary pseudo-code for the generation of a THT in accordance with such an embodiment is provided below. The THT may be generated by the encoder of the server processing system, or may be generated by a separate processing system and stored at the server.

At block 215 the THT is transmitted to a client processing system. For an embodiment in which the THT is generated from an MPEG-7 content description, the THT is transmitted in a similar fashion as the MPEG-7 content description itself. Transmission of the THT for such an embodiment is described below.

At block 220 the decoder of the client processing system decodes the THT and uses the information to synchronize the presentation of media content and its associated description for a variety of uses. Such uses may include selective presentation of multimedia content, resource management, carouseling (reinitialization) etc.

Figure 3:
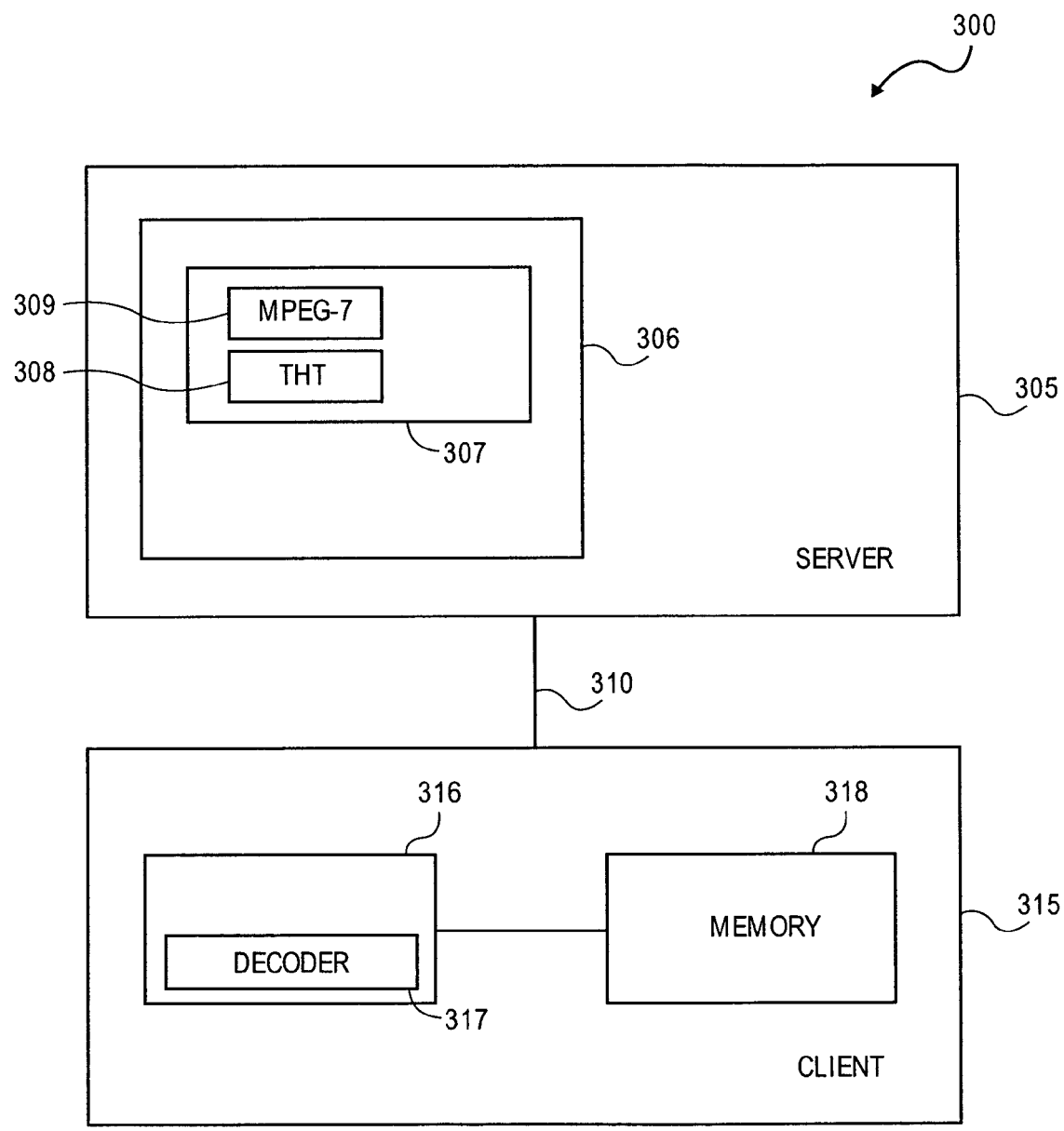
FIG. 3 illustrates a block diagram of a system for using the THT.

FIG. 3 illustrates a block diagram of a system for using the THT in accordance with one embodiment of the present invention. System 300, shown in FIG. 3, includes a server processing system (server) 305, a client processing system (client) 315, and an interface 310 coupling the server 305 and the client 315. Server 305 may be a home server or other computer system that is connected to a communications network, such as the Internet or a local area network (LAN).

Client 315 may be any form of device for presenting media. For example, client 315 may be any of a variety of processing systems such as a personal computer, a mobile computer, or a personal digital assistant (PDA). Additionally, client 315 may be a digital camera, a digital set top box, digital television, camcorder or cell phone. Typically, a system in accordance with one embodiment of the present invention may include any number of client processing systems coupled to a server processing system.

Interface 310, connecting server 305 and the client 315, may be any type of wired or wireless connection. For example, interface 310 may employ a modem, local area network, satellite transmission, cable connection, or combinations of these and other interfaces.

Server 305 contains a processing unit 306. Processing unit 306 has an encoder unit 307 that creates a THT from the MPEG-7 Content Description as was described above in reference to FIG. 2. The THT is then transmitted via interface 310 to the client 315. The THT, which may be stored separately, may be transmitted with the MPEG-7 content description from which it was derived, or with the media content to which it pertains. Alternatively, the THT may be sent alone, either before or after the MPEG-7 content description and/or media content. The transmission of the THT is described fully in reference to FIG. 5, below.

Client 315 contains a processing unit 316 that has a decoder unit 317. Upon receipt of the THT by the client 315, the decoder unit 317 decodes the THT for use by applications contained within client 315. Such applications may be stored in memory unit 318. Exemplary uses of the THT in accordance with alternative embodiments are described below.

Figure 4:
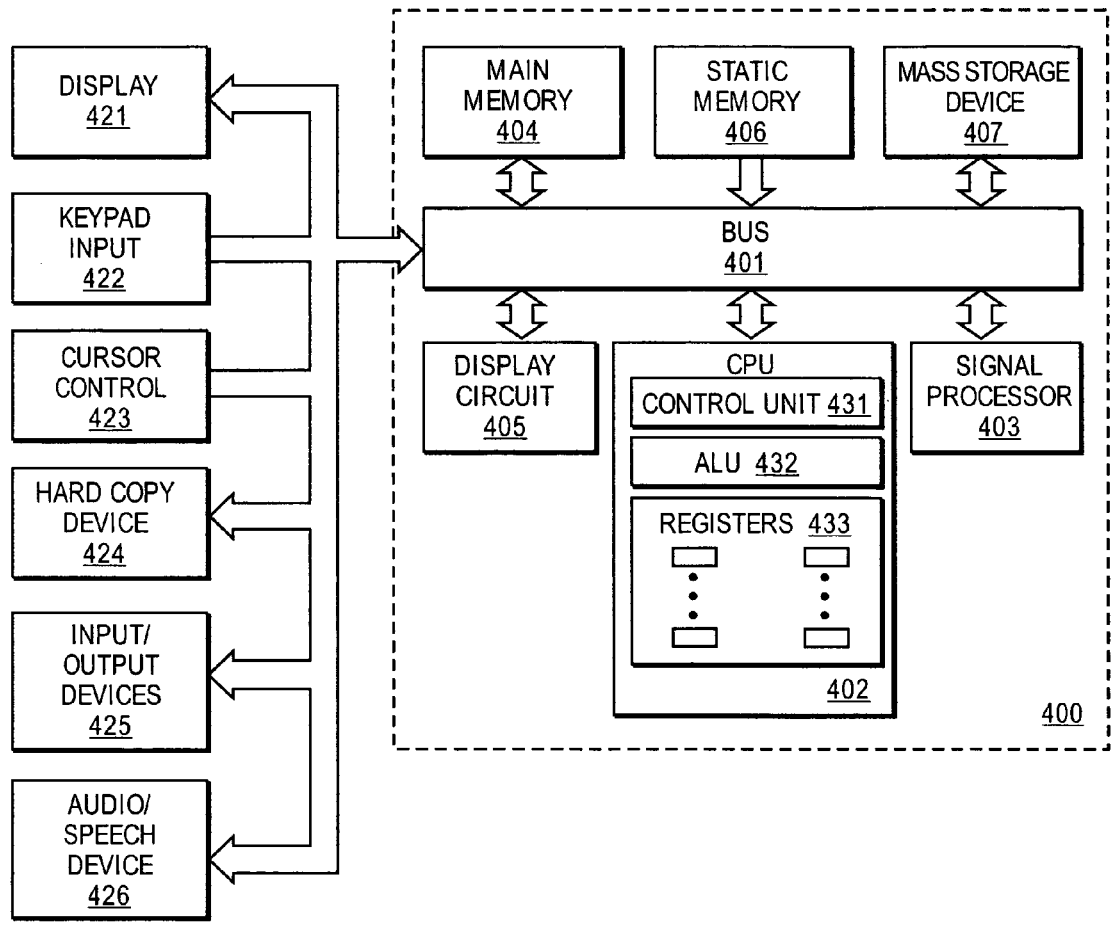
FIG. 4 is a block diagram illustrating an exemplary processing system 400 for creating and/or using the THT.

FIG. 4 is a block diagram illustrating an exemplary processing system 400 for creating and/or using the THT in accordance with embodiments of the present invention. The generation of a THT from an MPEG-7 content description (or other content description), and/or the decoding and use of the THT for synchronizing the content descriptions with the multimedia content it represents, as described herein, may be accomplished using processing system 400. Processing system 400 may function as a server or client processing system as described above in reference to FIG. 3. Processing system 400 represents one example of a system, which may have alternative configurations and architectures, that may be employed with embodiments of the present invention. For example, processing system 400 may represent a general-purpose computer, portable computer, PDA, digital set top box, or other consumer electronic device for presenting media. The components of processing system 400 are exemplary in which one or more components may be omitted or added. For example, one or more memory devices may be utilized for processing system 400.

Referring to FIG. 4, processing system 400 includes a central processing unit 402 and a signal processor 403 that may represent one or more conventional types of processor. Central processing unit 402 and signal processor 403 may be coupled to a display circuit 405, main memory 404, static memory 406, and mass storage device 407 via bus 401. Processing system 400 may also be coupled to a display 421, keypad input 422, cursor control 423, hard copy device 424, input/output (I/O) devices 425, and audio/speech device 426 via bus 401.

Bus 401 is a standard system bus for communicating information and signals. CPU 402 and signal processor 403 are processing units for processing system 400. CPU 402 or signal processor 403 or both may be used to process information and/or signals for processing system 400. CPU 402 includes a control unit 431, an arithmetic logic unit (ALU)

432, and several registers 433, which are used to process information and signals. Signal processor 403 may also include similar components as CPU 402.

Main memory 404 may be, for example, a random access memory (RAM) or some other dynamic storage device, for storing information or instructions (program code), which are used by CPU 402 or signal processor 403. Main memory 404 may store temporary variables or other intermediate information during execution of instructions by CPU 402 or signal processor 403. Static memory 406, may a read only memory (ROM) and/or other static storage devices, for storing information or instructions, which may also be used by CPU 402 or signal processor 403. Mass storage device 407 may be a hard or floppy disk drive or optical disk drive, for storing information or instructions for processing system 400.

Display 421 may be a cathode ray tube (CRT) or liquid crystal display (LCD). Display device 421 displays information or graphics to a user. Processing system 400 may interface with display 421 via display circuit 405. Keypad input 422 is an alphanumeric input device with an analog to digital converter. Cursor control 423 may be a mouse, a trackball, or cursor direction keys, for controlling movement of an object on display 421. Hard copy device 424 may be a laser printer, for printing information on paper, film, or some other like medium. A number of input/output devices 425 may be coupled to processing system 400.

The generation of a THT from an MPEG-7 content description, its transmission, decoding, and use in accordance with an embodiment of the present invention may be implemented by hardware and/or software contained within processing system 400. For example, CPU 402 or signal processor 403 may execute code or instructions stored in a machine-readable medium, e.g., main memory 404.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Transmission of the THT from an encoder at the server to the decoder at the client may be accomplished using the same transport mechanism that is used to transmit the MPEG-7 content description. The THT is, in essence, a high-level synopsis of the MPEG-7 content description, providing information regarding timed events (description of an event and when it occurs). Like the MPEG-7 content description, the THT is also written in XML conforming to an MPEG-7 DDL schema, or equivalently an XML Schema definition. Therefore, the THT may likewise be represented as a tree diagram with access to references using paths and nodes.

Like an MPEG-7 content description, the THT may be transmitted within an MPEG-2 transport stream. MPEG-2 has various streams (e.g., video, audio, etc.) that are multiplexed for transport. Each stream has a process identification number (PID) which is a pointer to the particular stream itself. The PIDs are stored in a program association table (PAT) that can be appended with a unique PID identifying the THT stream. In similar fashion the THT may be transmitted in an elementary stream that is associated with an MPEG-4 media object. MPEG-4 encompasses particular media streams as objects with each object having its own object descriptor identification. That is, a media object may be associated with an object descriptor that contains a collection of elementary streams comprising the media object.

Alternatively, the THT may be transmitted with the MPEG-7 content description. Such a transmission scheme may be preferable where the MPEG-7 content description is transmitted without its associated content, which may be transmitted subsequently, or not at all. Within the MPEG-7 Systems information for the content description, there is additional space that contains initial decoder configuration information. The THT may be transmitted as part of this configuration information. The decoder configuration information is one of the first things sent when an MPEG-7 description is transmitted. The THT, transmitted as part of this configuration information, would therefore, be available when the remainder of the MPEG-7 content description arrives. Limited capability client devices (e.g., text display only, low bandwidth, etc.) may then use the THT to tailor the MPEG-7 content descriptions for presentation or storage. That is, the client devices can schedule particular events of interest based on the information obtained from the sync events in the THT. For example, a client could schedule a particular event such as the sports portion of a news program instead of viewing the entire news telecast.

For stored media, the entire MPEG-7 content description is available a priori and therefore the entire THT may be generated and stored for later transmission. On the other hand, for multimedia content that is broadcast live, the MPEG-7 content descriptions, and hence the THT, cannot be generated a priori, but may be generated in segments as the event is broadcast or later. Additionally, a limited memory client device may not be able to store the entire THT and may therefore store, use, and discard portions of the THT on an on-going basis.

Figure 5:
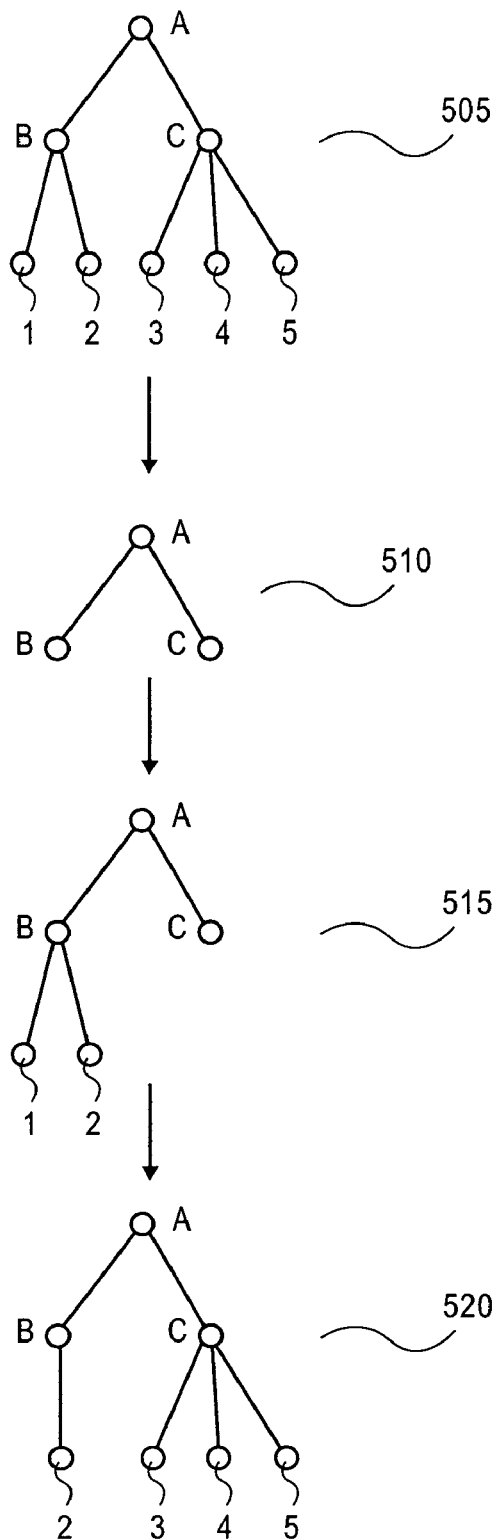
FIG. 5 illustrates how a THT is transmitted in access units from a server encoder, and regenerated at the client decoder.

The THT, when represented as XML data, may be transmitted in pieces called access units (AUs) in the same manner as MPEG-7 description data. FIG. 5 illustrates how a THT is transmitted in AUs from a server encoder, and regenerated at the client decoder. An AU may start at any level, and may be an individual node (e.g., node 1), or a subtree representing a time-ordered group of nodes (e.g., node B with its children nodes 1 and 2). The choice of AU depends upon the content and application. FIG. 5 shows a THT represented as a tree 505 that includes nodes A, B, C, and 1 though 5. The THT tree may be transmitted progressively by using AUs that contain commands to add nodes, delete nodes, and replace nodes. The fragments of the THT tree may be sent ordered by time using such update commands.

A lower level node cannot be transmitted before the higher-level nodes containing that node. For example node 4 cannot be transmitted without first transmitting the higher-level parts of the tree containing node 4 (i.e., nodes A and C). In one embodiment, the first update command used will contain this higher-level "skeleton" or the static part of the tree. In FIG. 5, this higher-level tree diagram is shown as tree 510 and includes nodes A, B, and C. At this point, to progressively build the THT tree, an "add node" command, a navigation path, and the AU payload are transmitted. For example, to add node 1 the command "add node /B/" would be transmitted. The decoder receives the command, proceeds from root node A to node B, and at node B adds the AU payload (i.e., node 1). Tree diagram 515 shows a portion of the THT tree after nodes 1 and 2 have been added. At this point segments of the tree may be added in time order while segments that have already been used may be deleted in consideration of the limited storage capability at the client. Tree diagram 520 shows a progressive stage of the THT tree transmission in which nodes 3, 4, and 5 have been added as described above, and node 1 has been deleted with the command "delete node /B/1". The process is continued until the entire THT has been transmitted.

Figure 6:
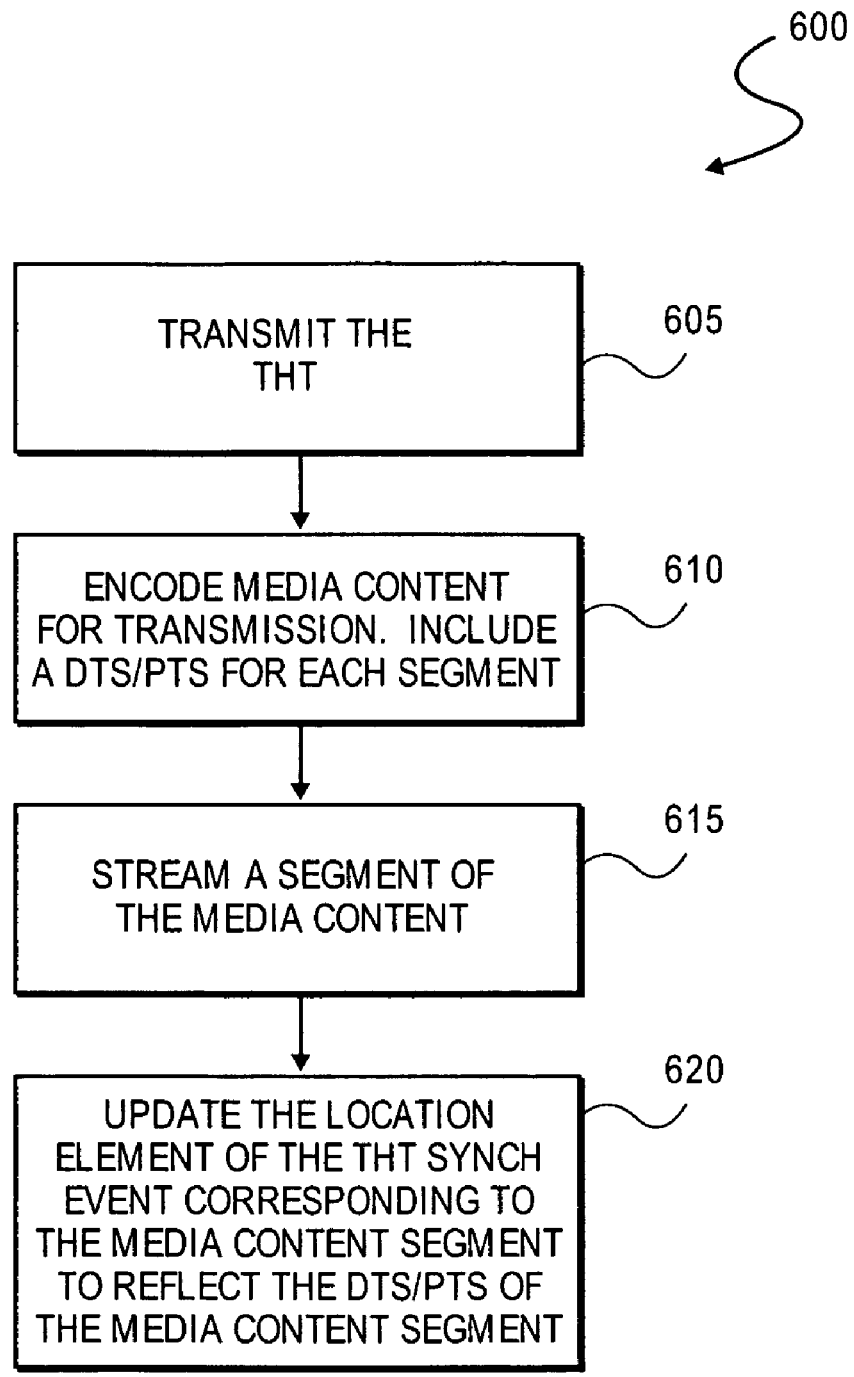
FIG. 6 is a process flow diagram illustrating the use of the THT to synchronize the presentation of media content and its associated description.

FIG. 6 is a process flow diagram illustrating the use of the THT to synchronize the presentation of media content and its associated description in accordance with one embodiment of the present invention. Process 600, shown in FIG. 6 begins with block 605 in which the THT is transmitted to the client decoder as described above. At this point the THT is available at the client decoder and the THT may now be used to synchronize media content and its description. In an alternative embodiment, the THT may not be transmitted to the client decoder, and used only at the encoder/server to schedule for the timed delivery of content and description access units.

At block 610 the media content is encoded for transmission. During a transmission, e.g., Internet transmission, the transmitter initially conveys a master time clock/System Time Clock (MTC/STC) to the receiver. The MTC/STC is used by the transmitter and receiver as a reference for synchronization. At run time, as media data is encoded for transmission, the encoder adds a decode time stamp (DTS) and a presentation time stamp (PTS) to the media content delivery units. The delivery unit depends on the underlying transport layer but usually includes the notion of a media access unit, which is a unit of media data with associated time information that is delivered from the sender to the receiving system. Once the decoder is aware of the MTC, the DTS indicates the time at which the data should be decoded and the PTS indicates the time at which the data should be presented/rendered. The times used in the content description data are written in terms of media time or normal playback time and need not be the same as the PTS or DTS. For example, the first frame of a video may have a media time of 0 (in normal playback time) but will have a PTS that indicates that playback starts at a certain time, such as 12:15AM, Nov. 1, 2001. It is necessary to update (i.e. offset) the times in the sync events, which are media times, to get the correct PTS (or DTS) time values.

At block 615 the media content is streamed in delivery units (i.e. media access units). In order for the decoder to present the media data synchronously with the description, it is necessary to reflect the DTS or PTS of the media data to the descriptions so that they will be decoded and presented concurrently.

At block 620 when a segment of the media content is streamed, each relevant location element (which might be represented using an XML element called MediaTime, etc.) of the THT is updated to reflect the PTS (or DTS) of the corresponding media delivery unit. The update of the sync event time may be done by transmitting the correct PTS (or DTS) value for the media delivery unit via an update command (e.g., replace node command). In an embodiment where the entire THT is transmitted via a separate elementary stream, the update commands transmitted are pertinent to, and only affect, the THT.

In an alternative embodiment, the THT is transmitted in an incremental manner in the same stream as the content description. For such an embodiment, each the information for each sync event may be sent as an update command with the time value mapped to the DTS/PTS of the media time at the encoder itself. Decoder memory capacity may require that the content description and the THT be built in pieces as discussed above. When this is done in the same elementary stream as the content description itself, the decoder must be able to ascertain whether an update command pertains to the THT or to the content description. Therefore, a provision may be made at the level of the update commands to distinguish the in-band (content) versus out-of-band (THT) information.

For example, an XML descriptor attribute added to each access unit (e.g., "type") may be used to distinguish THT from the content descriptions (e.g., type00=THT, type01=MPEG-7 content descriptions).

As discussed above, for multimedia content that is broadcast live, the MPEG-7 content descriptions, and hence the THT, cannot be generated a priori, but is generated incrementally when event is broadcast or after the event occurs. In such a case, as the events take place, and their description is generated at the encoder, the sync events may be transmitted incrementally as updates to the THT with the time values mapped to the PTS (or DTS) of the live media.

The decoder may use the THT for a variety of applications. For example, because the THT provides summary information about timed events, the decoder may use the THT for random access to the media content. The decoder may request transmission from the encoder of AUs containing the portion of the content relevant to a specified time interval. This allows a user to select a specified portion of the media content, based upon its content, for presentation. For example, a user may wish to present only those portions of the highlights of a sports event in which scoring is taking place. Or a user may select only the financial report from an entire news program.

The decoder may use the THT for resource management as well. In the case of a presentation device having low memory and/or low bandwidth, the device software has to manage the resources to provide optimum performance.

Figure 7:
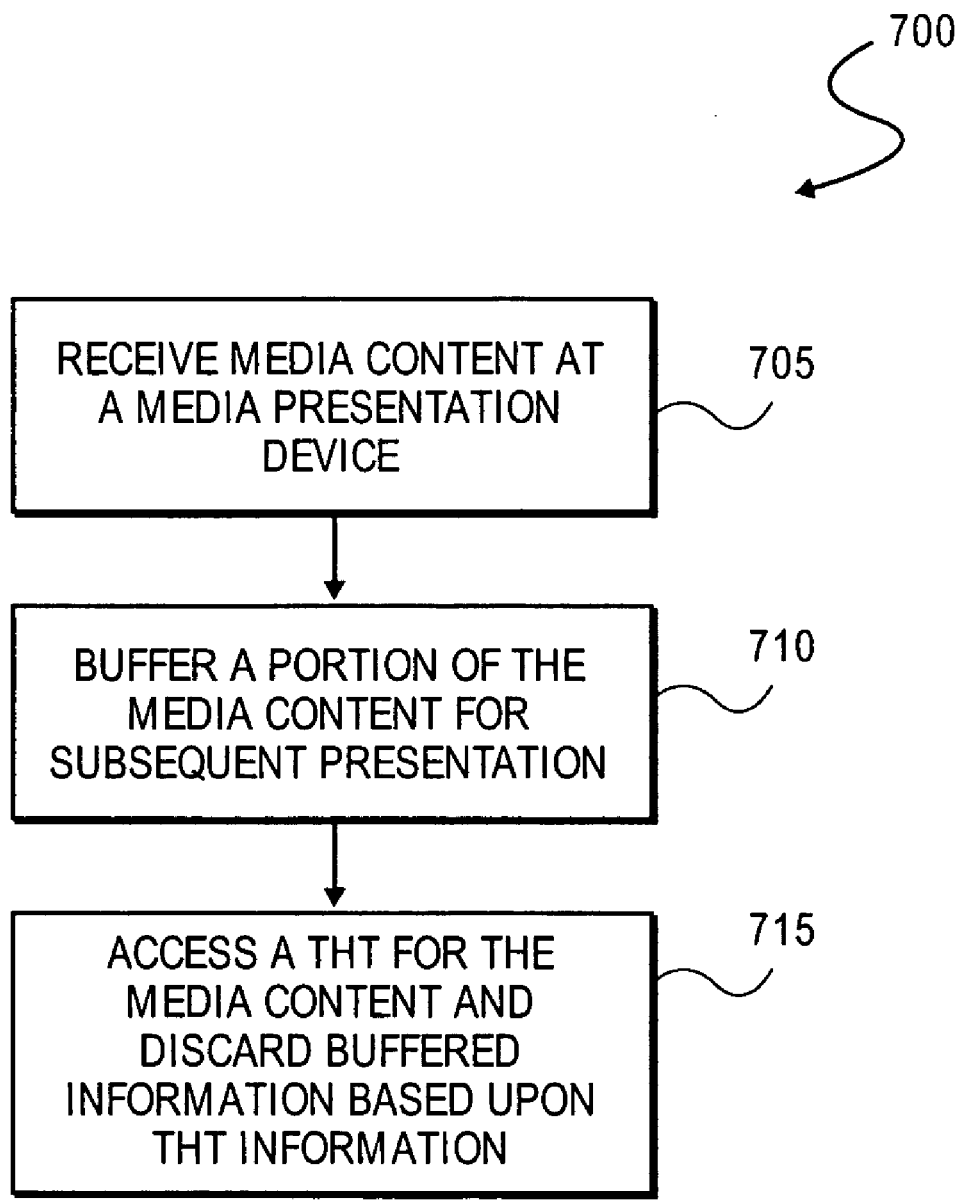
FIG. 7 is a process flow diagram illustrating the use of an embodiment of the THT for resource management.

FIG. 7 is a process flow diagram illustrating the use of an embodiment of the THT for resource management. Process 700, shown in FIG. 7, begins at block 705 in which media content is received by a media presentation device. The presentation device may be a digital camera, a digital set top box, digital television, camcorder or cell phone, or other similar device.

At block 710 a portion of the media content is buffered for subsequent presentation. For a device receiving video frames, for example, the device typically buffers some amount of the media data. Typically video data is transmitted in an encoded form in which particular frames ("I frames") are used as reference frames with many subsequent frames having a dependency on them. Each I frame must be preserved while dependent frames are being decoded. A scene may cause an I-frame to be sent and thus previous frames may be discarded thus freeing buffer space.

At block 715 the device accesses the THT for the media content and discards or retains buffered information based upon the information contained in the THT. The THT provides could provide the duration of each scene which indicates how long particular frames need to be buffered, thus facilitating resource management.

The decoder may also use the THT for carousel purposes. For example, when a client device accesses a video being streamed, the client typically awaits a resynchronization marker from the server. Such markers are transmitted in the bitstream at regular intervals to allow the client device to synchronize their state with the server's data transmission. However, the marker does not provide information regarding the media content from the point of resynchronization (i.e., the user has no way of knowing if the information is of interest). The THT may be used to resynchronize with the server at any arbitrary future node (e.g., a particular point of interest). So for example, if a news program is being streamed, the THT allows a user to determine a point of interest at which to access the program. For example, the user may resynchronize with the server for presentation of the financial report without having to present the sports report. This is particularly beneficial for battery-operated devices.

The THT may also be used by the encoder to divide MPEG-7 content descriptions into meaningful AUs for transmission. The THT divides the content description into sync events. The encoder has access to both the THT and the content description and may therefore use the sync events to determine the AUs which would be most suitable for transmission of the MPEG-7 content descriptions.

Exemplary pseudo-code for generation of a THT in accordance with one embodiment:

```
<complexType name = "TransportHintType">
    <complexContent>
        <sequence>
            <element name = "SyncEvent" type = "SyncEventType"
            minOccurs = "0" maxOccurs =
"unbounded"/>
        </sequence>
    </complexContent>
</complexType>
```

| Name | Definition |
| --- | --- |
| TransportHintType | Specifies a table that provides a list of timed events in the form of SyncEvents that provides an encoder or decoder with hints on synchronization between media delivery and content description times |
| SyncEvent | Specifies each entry of the table in terms of SyncEventType. |

```
<complexType name = "SyncEventType">
    <complexContent>
        <sequence>
            <element name = "SyncEventRef" type =
            "mpeg7:ReferenceType" minOccurs = "1"
maxOccurs = "1"/>
            <element name = "Location" type =
            "mpeg7:MediaLocatorType" minOccurs = "0"/>
            <element name = "Definition" type =
            "mpeg7:TextAnnotationType" minOccurs = "0"/>
        </sequence>
    </complexContent>
</complexType>
```

| Name | Definition |
| --- | --- |
| SyncEventType | Specifies the timed event that provides a hint for creation and scheduling of MPEG-7 AUs |
| SyncEventRef | Specifies the reference (e.g., Xpath) to a node that carries the description of the temporal media data specified by Location. |
| Location | Specifies the location of temporal media using MediaLocatorType for data such as video or audio. Typical examples are the TemporalSegmentLocatorType or ImageLocatorType. |
| Definition | Gives a brief (optional) textual description (a label) of the timed event on the referenced node. |

In the foregoing specification, the invention has been described with reference to specific exemplary embodiments thereof. It will, however, be evident that various modifications and changes may be made thereto without departing from the broader spirit and scope of the invention as set forth in the appended claims. Likewise, references to processing systems, media transmission formats, multimedia content description standards (MPEG-7), etc. are exemplary. The specification and drawings are, accordingly, to be regarded in an illustrative sense rather than a restrictive sense.

What is claimed is:

1. A computerized method comprising:
accessing a content description of a media content, the content description containing a plurality of descriptor values, each descriptor value describing a timed event in the media content; and
generating, by a computer, for transmission to a media presentation device, a set of sync events from the content description, wherein the set of sync events is used by the media presentation device to synchronize transmission of the descriptor values with presentation of the timed events by the media presentation device, each sync event logically relating a timed event and a temporal interval that defines an occurrence of the timed event in the media content, wherein the set of sync events is subsequently transmitted as a table to the media presentation device for access by a user to control the presentation of the timed events and the transmission of the descriptor values, the table ordered according to fields in the sync events.

2. The method of claim 1, wherein each sync event comprises an association between a reference element and a location element, the reference element specifying a path in the content description to a descriptor value for a timed event, the location element specifying the temporal interval for the timed event.

3. The method of claim 2, wherein each sync event is ordered by its temporal interval.

4. The method of claim 2, wherein the content description is an MPEG-7 content description.

5. The method of claim 4, wherein generating a set of sync events comprises:
parsing the content description to extract MPEG-7 XML tags that provide information related to a temporal order of the timed events.

6. The method of claim 5, wherein the MPEG-7 XML tags are selected from the group consisting of Media Time, MediaLocator, TemporalSegmentLocator, and ImageLocator.

7. A computerized method comprising:
transmitting, to a media presentation device, a set of sync events as a table ordered according to fields in the sync events, each sync event comprising a reference element and a location element, the reference element specifying a path within a content description to a descriptor value that describes a timed event in a media content, the location element specifying a temporal interval that defines an occurrence of the timed event in the media content, the sync event generated from a content description containing a plurality of descriptor values, and wherein the sync event is used by the media presentation device to synchronize transmission of the descriptor values with presentation of the time events by the media presentation device; and
synchronizing, by a computer, transmission of the descriptor values with presentation of the timed events by updating the location element of each sync event to be relative to a presentation time stamp for the media content, the presentation time stamp set during encoding of the media content, wherein the set of sync events is accessible at the media presentation device by a user to control the presentation of the timed events and the transmission of the descriptor values.

8. The method of claim 7, wherein the set of sync events is transmitted by including the set of sync events as an element of a delivery transport mechanism selected from the group consisting of an MPEG-2 data stream, an MPEG-4 ES for a media object, and MPEG-7 decoder configuration information.

9. A computerized method comprising:
receiving a set of sync events as a table ordered according to fields in the sync events, each sync event comprising a reference element and a location element, the reference element specifying a path within a content description to a descriptor value that describes a timed event in a media content, the location element specifying a temporal interval for an occurrence of the timed event in the media content, the sync event generated from a content description containing a plurality of descriptor values;

receiving the media content; and updating, by a computer, the location element of a sync event to be relative to a presentation time stamp for the media content, wherein the sync event is used by a multimedia presentation device to synchronize transmission of the descriptor values with presentation of the time events by the media presentation device, the presentation time stamp being set during encoding of the media content, wherein the set of sync events is accessible at the media presentation device by a user to control the presentation of the timed events and the transmission of the descriptor values.

10. The method of claim 9, wherein the updating is caused by an update command.

11. The method of claim 10, wherein the update command distinguishes between updates to the set of sync events and updates to the content description.

12. A machine-readable storage medium having executable instructions which, when executed by a processor cause the processor to perform a method, the method comprising:

accessing the content description of a media content, the content description containing a plurality of descriptor values, each descriptor value describing a timed event in the media content; and generating, for transmission to a media presentation device, a set of sync events from the content description, wherein the set of sync events is used by the media presentation device to synchronize transmission of the descriptor values with presentation of the timed events by the media presentation device, each sync event logically relating a timed event and a temporal interval that defines an occurrence of the timed event in the media content, wherein the set of sync events is subsequently transmitted as a table to the media presentation device for access by a user to control the presentation of the timed events and the transmission of the descriptor values, the table ordered according to fields in the sync events.

13. The machine-readable storage medium of claim 12, wherein each sync event comprises an association between a reference element and a location element, the reference element specifying a path in the content description to a descriptor value for a timed event, the location element specifying the temporal interval for the timed event.

14. The machine-readable storage medium of claim 13, wherein each sync event is ordered based on its temporal interval.

15. The machine-readable storage medium of claim 13, wherein the content is a MPEG-7 content description.

16. The machine-readable storage medium of claim 15, wherein generating a set of sync events comprises:

parsing the content description to extract MPEG-7 XML tags that provide information related to a temporal order of the timed events.

17. The machine-readable storage medium of claim 16, wherein the MPEG-7 XML tags are selected from the group consisting of MediaTime, MediaLocator, TemporalSegmentLocator, and ImageLocator.

18. The machine-readable storage medium of claim 13, wherein the method further comprises:

transmitting, to a multimedia presentation device, a set of sync events as a table ordered according to fields in the sync events, each sync event comprising a reference element and a location element, the reference element specifying a path within the content description to a descriptor value that describes a timed event in a media content, the location element specifying a temporal interval for an occurrence of the timed event in the media content, the sync event generated from a content description containing a plurality of descriptor values, and wherein the sync event is used by the media presentation device to synchronize transmission of the descriptor values with presentation of the time events by the media presentation device; and updating the location element of each sync event to be relative to a presentation time stamp for the media content, wherein the sync event is used by a multimedia presentation device to synchronize transmission of the descriptor values with presentation of the timed events at the media presentation device, the presentation time stamp being set during encoding of the media content, wherein the set of sync events is accessible at the media presentation device by a user to control the presentation of the timed events and the transmission of the descriptor values.

19. The machine-readable storage medium of claim 18, wherein the set of sync events is transmitted by including the set of sync events as an element of a delivery transport mechanism selected from the group consisting of an MPEG-2 data stream, MPEG-4 ES for a media object, and MPEG-7 decoder configuration information.

20. A machine-readable storage medium having executable instructions which, when executed by a processor cause the processor to perform a method, the method comprising:

receiving a set of sync events as a table ordered according to fields in the sync events, each sync event comprising a reference element and a location element, the reference element specifying a path within a content description to a descriptor value that describes a timed event in a media content, the location element specifying a temporal interval for an occurrence of the timed event in the media content, the sync event generated from a content description containing a plurality of descriptor values;

receiving the media content; and updating the location element of a sync event to be relative to a presentation stamp for the media content, wherein the sync event is used by a multimedia presentation device to synchronize transmission of the descriptor values with presentation of the timed events by the media presentation device, the presentation time stamp being set during encoding of the media content, wherein the set of sync events is accessible at the media presentation device by a user to control the presentation of the timed events and the transmission of the descriptor values.

21. The machine-readable storage medium of claim 20, wherein the updating is caused by an update command.

22. The machine-readable storage medium of claim 21, wherein the update command distinguishes between updates to the set of sync events and updates to the content description.

23. An apparatus comprising:

a processor, and a memory coupled thereto, the memory having stored thereon executable instructions, which, when executed by the processor, cause the processor to:

access a content description of a media content, the content description containing a plurality of descriptor values, each descriptor value describing a timed event in the media content, and generate for transmission to a media presentation device, a set of sync events from the content description, wherein the set of sync events is used by the media presentation device to synchronize transmission of the descriptor values with presentation of the timed events by the media presentation device, each sync event logically relating a timed event and a temporal interval that defines an occurrence of the timed event in the media content, wherein the set of sync events is subsequently transmitted as a table to the media presentation device for access by a user to control the presentation of the timed events and the transmission of the descriptor values, the table ordered according to fields in the sync events.

24. The apparatus of claim 23, wherein each sync event comprises a reference element and a location element, the reference element specifying a path within the content description to a descriptor value for a timed event, the location element specifying the temporal interval for the timed event.

25. The apparatus of claim 24, wherein each sync event is ordered by its temporal interval.

26. The apparatus of claim 24, wherein the content description is an MPEG-7 content description.

27. The apparatus of claim 26, wherein to generate a set of sync events further comprises:
parsing the content description to extract MPEG-7 XML tags that provide information related to a temporal order of the timed events.

28. The apparatus of claim 27, wherein the MPEG-7 XML tags are selected from the group consisting of MediaTime, MediaLocator, TemporalSegmentLocator, and ImageLocator.

29. The apparatus of claim 24 further comprising:
a transmitter, coupled to the processor, to transmit the set of sync events as a table along with the media content, wherein each sync event comprises a location element that specifies the temporal interval and the table is ordered according to fields in the sync events; and
an encoder to update the location element of each sync event to be relative to a presentation time stamp for the media content set that is set by the encoder.

30. The apparatus of claim 29, wherein the encoder is configured to determine the presentation time stamp.

31. The apparatus of claim 30, wherein the updating is caused by an update command.

32. The apparatus of claim 31, wherein the update command distinguishes between updates to the set of sync events and updates to the content description.

33. The apparatus of claim 29, wherein the set of sync events is transmitted by including the set of sync events as an element of a delivery mechanism selected from the group consisting of an MPEG-2 data stream, an MPEG-4ES for a media object, and MPEG-7 decoder configuration information.

34. An apparatus comprising:
a processor, and a memory coupled thereto, the memory having stored thereon executable instructions, which, when executed by the processor, cause the processor to receive a set of sync events as a table ordered according to fields in the sync events, each sync event comprising a reference element and a location element, the reference element specifying a path within a content description to a descriptor value that describes a timed event in a media content, the location element specifying a temporal interval for an occurrence of the timed event in the media content, to receive the media content, the sync event generated from a content description containing a plurality of descriptor values, and to update the location element of a sync event to be relative to a presentation time stamp for the media content, wherein the sync event is used by a multimedia presentation device to synchronize transmission of the descriptor values with presentation of the timed events by the media presentation device, the presentation time stamp being set during encoding of the media content, wherein the set of sync events is accessible at the media presentation device by a user to control the presentation of the timed events and the transmission of the descriptor values.

35. The apparatus of claim 34, wherein the updating is caused by an update command.

36. The apparatus of claim 35, wherein the update command distinguishes between updates to the set of sync events and updates to the content description.

37. A computerized method comprising:
generating, by a computer, for transmission to a media presentation device, a set of sync events from a content description of a media content, the content description containing a plurality of descriptor values, each descriptor value describing a timed event in the media content, each sync event comprising a reference element and a location element, the reference element specifying a path within the content description to a descriptor value for a timed event in the media content, the location element specifying a temporal interval for an occurrence of the timed event in the media content, and wherein the set of sync events is used by the media presentation device to synchronize transmission of the descriptor values with presentation of the time events by the media presentation device;
encoding the media content for transmission, a presentation time stamp added to the media content; and
synchronizing transmission of the descriptor values with presentation of the timed events by a media presentation device by updating the location element of a sync event to be relative to the presentation time stamp, wherein the set of sync events is subsequently transmitted as a table to the media presentation device for access by a user to control the presentation of the timed events and the transmission of the descriptor values, the table ordered according to fields in the sync events.

38. The method of claim 37 further comprising transmitting the media content and the set of sync events.

39. The method of claim 37, wherein the set of sync events is transmitted prior to updating.

40. A machine-readable storage medium having executable instructions which, when executed by a processor cause the processor to perform a method, the method comprising:
generating, for transmission to a media presentation device, a set of sync events from a content description of a media content, the content description containing a plurality of descriptor values, each descriptor value describing a timed event in the media content, each sync event comprising a reference element and a location element, the reference element specifying a path within the content description to a descriptor value for a timed event in the media content, the location element specifying a temporal interval for an occurrence of the timed event in the media content, and wherein the set of sync events is used by the media presentation device to synchronize transmission of the descriptor values with presentation of the time events by the media presentation device;
encoding media content for transmission, a presentation time stamp added to the media content; and synchronizing transmission of the descriptor values with presentation of the timed events by updating the location element of a sync event to be relative to the presentation time stamp, wherein the set of sync events is subsequently transmitted as a table to the media presentation device for access by a user to control the presentation of the timed events and the transmission of the descriptor values, the table ordered according to fields in the sync events.

41. The machine-readable storage medium of claim 40 further comprising transmitting the media content and the set of sync events.

42. The machine-readable storage medium of claim 40, wherein the set of sync events is transmitted prior to updating.

43. A computerized method comprising:
receiving media content at a media presentation device, the media content having a content description containing a plurality of descriptor values, each descriptor value describing a timed event in the media content;
buffering a portion of the media content for subsequent presentation;
accessing, by a computer, a table of sync events, wherein the sync events are used by the media presentation device to synchronize transmission of the descriptor values with presentation of the timed events by a media presentation device, the table ordered according to fields in the sync events, each sync event logically relating a timed event and a temporal interval that defines an occurrence of the timed event in the media content, wherein the set of sync events is accessible at the media presentation device by a user to control the presentation of the timed events and the transmission of the descriptor values; and
discarding buffered portions of the media content in accordance with duration values specified for the timed events in the temporal intervals of the set of sync events.

44. The method of claim 43, wherein each sync event comprises a reference element and a location element, the reference element specifying a path within the content description to a descriptor value for a timed event, the location element specifying the temporal interval for the timed event.

45. The method of claim 43, wherein timed events in the media content are selected for display on the media presentation device as a result of accessing the set of sync events by the user.

46. A machine-readable storage medium having executable instructions which, when executed by a processor cause the processor to perform a method, the method comprising:
receiving media content at a media presentation device, the media content having a content description containing a plurality of descriptor values, each descriptor value describing a timed event in the media content;
buffering a portion of the media content for subsequent presentation;
accessing a table of sync events, wherein the sync events are used by the media presentation device to synchronize transmission of the descriptor values with presentation of the timed events by a presentation device, the table ordered according to fields in the sync events, each sync event logically relating a timed event and a temporal interval that defines an occurrence of the timed event in the media content, wherein the set of sync events is accessible at the media presentation device by a user to control the presentation of the timed events and the transmission of the descriptor values; and
discarding buffered portions of the media content in accordance with duration values specified for the timed events in the temporal intervals of the set of sync events.

47. The machine-readable storage medium of claim 46, wherein each sync event comprises a reference element and a location element, the reference element specifying the path within the content description to a descriptor value for a timed event, the location element specifying the temporal interval for the timed event.

48. The machine-readable storage medium of claim 46, wherein timed events in the media content are selected for display on the media presentation device as a result of accessing the set of sync events by the user.

* * * * *